(12) United States Patent
Huth et al.

(10) Patent No.: US 10,404,718 B2
(45) Date of Patent: Sep. 3, 2019

(54) METHOD AND DEVICE FOR TRANSMITTING SOFTWARE

(71) Applicant: Robert Bosch GmbH, Stuttgart (DE)

(72) Inventors: Christopher Huth, Leonberg (DE); Paulius Duplys, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 339 days.

(21) Appl. No.: 15/373,679

(22) Filed: Dec. 9, 2016

(65) Prior Publication Data
US 2017/0180392 A1 Jun. 22, 2017

(30) Foreign Application Priority Data
Dec. 17, 2015 (DE) .......... 10 2015 225 651

(51) Int. Cl.
*H04L 9/08* (2006.01)
*H04L 9/32* (2006.01)
*H04L 29/06* (2006.01)

(52) U.S. Cl.
CPC .......... *H04L 63/123* (2013.01); *H04L 9/0869* (2013.01); *H04L 9/3234* (2013.01); *H04L 9/3236* (2013.01); *H04L 63/0428* (2013.01)

(58) Field of Classification Search
CPC ... H04L 63/12; H04L 63/123; H04L 63/0428; H04L 63/126; H04L 63/0861;
(Continued)

(56) References Cited

U.S. PATENT DOCUMENTS 5,970,144 A * 10/1999 Chan .................. H04W 12/06
380/247
6,028,937 A * 2/2000 Tatebayashi ....... G06Q 20/3674
380/201
(Continued)

FOREIGN PATENT DOCUMENTS

EP 1211587 A1 * 6/2002 ............. G06F 8/61
EP 1550930 A1 * 7/2005 ............. G06F 21/10
(Continued)

OTHER PUBLICATIONS

U. Ruhrmair, "SIMPL systems: On a public key variant of physical unclonable functions," IACR Cryptology ePrint Archinve, No. 255, 2009.
(Continued)

*Primary Examiner* — Kambiz Zand
*Assistant Examiner* — Mahabub S Ahmed
(74) *Attorney, Agent, or Firm* — Norton Rose Fulbright US LLP; Gerard Messina

(57) ABSTRACT

A method for transmitting software in which a checker generates two random numbers. The checker calculates a cryptographic key based on the second random number based on a measured hardware function of the device. The checker encrypts the software into a cryptogram using the key, and transmits the cryptogram to the device. The checker transmits the first random number to the device, and receives a checksum from the device. The checker calculates a reference value based on the first random number and an emulated random access memory of the device, with the aid of the measured hardware function and a predefined cryptographic hash function. The checker subjects the checksum to a check based on the reference value, and if the check is successful, the checker transmits the second random number to the device.

8 Claims, 2 Drawing Sheets

(58) Field of Classification Search
CPC ............. H04L 63/0863; H04L 63/0866; H04L 63/0877; H04L 63/0869; H04L 63/3234; H04L 63/3236; H04L 63/3247
USPC ........................................................ 713/161
See application file for complete search history.

(56) References Cited

U.S. PATENT DOCUMENTS

| | | | | |
|---|---|---|---|---|
| 6,108,420 | A * | 8/2000 | Larose | G06F 8/61 380/30 |
| 6,141,421 | A * | 10/2000 | Takaragi | H04L 9/0643 380/269 |
| 6,263,445 | B1 * | 7/2001 | Blumenau | G06F 21/31 380/282 |
| 7,051,211 | B1 * | 5/2006 | Matyas, Jr. | G06F 21/10 380/201 |
| 7,471,790 | B2 * | 12/2008 | Yoshida | H04L 9/0852 380/28 |
| 8,041,957 | B2 * | 10/2011 | Michaelis | G06F 21/51 713/187 |
| 8,285,949 | B2 * | 10/2012 | De Atley | G06F 21/53 711/154 |
| 9,432,086 | B2 * | 8/2016 | Chew | G06F 21/34 |
| 9,509,512 | B1 * | 11/2016 | Baigal | H04L 9/32 |
| 9,531,539 | B2 * | 12/2016 | Shimoyama | G06F 21/32 |
| 9,572,029 | B2 * | 2/2017 | Gaudet | H04W 12/06 |
| 9,940,446 | B2 * | 4/2018 | Miller | G06F 21/10 |
| 2003/0079042 | A1 * | 4/2003 | Yamanaka | H04L 29/06 709/247 |
| 2003/0084291 | A1 * | 5/2003 | Yamamoto | H04L 63/02 713/168 |
| 2003/0145203 | A1 * | 7/2003 | Audebert | G06Q 20/341 713/169 |
| 2003/0149670 | A1 * | 8/2003 | Cronce | G06F 21/121 705/59 |
| 2005/0182732 | A1 * | 8/2005 | Miller | G06F 21/10 705/59 |
| 2005/0210014 | A1 * | 9/2005 | Asano | G06F 21/10 |
| 2007/0183593 | A1 * | 8/2007 | Yoshida | H04L 9/0852 380/28 |
| 2008/0044011 | A1 * | 2/2008 | Yoshida | H04L 1/0045 380/28 |
| 2008/0082825 | A1 * | 4/2008 | Mizushima | G06Q 20/341 713/172 |
| 2009/0016527 | A1 * | 1/2009 | Vigarie | H04L 9/0844 380/259 |
| 2010/0100747 | A1 * | 4/2010 | Boscher | G09C 1/00 713/187 |
| 2010/0172496 | A1 * | 7/2010 | Furukawa | H04L 9/0869 380/46 |
| 2011/0026714 | A1 * | 2/2011 | Thomas | G06F 21/57 380/278 |
| 2012/0002803 | A1 * | 1/2012 | Adi | H04L 9/0866 380/28 |
| 2012/0213368 | A1 * | 8/2012 | Falk | G06F 21/31 380/270 |
| 2013/0268776 | A1 * | 10/2013 | Motoyama | H04L 9/003 713/189 |
| 2013/0339407 | A1 * | 12/2013 | Sharpe | G06F 3/0611 707/827 |
| 2014/0143443 | A1 * | 5/2014 | Takahashi | H04L 45/20 709/241 |
| 2014/0223524 | A1 * | 8/2014 | Lu | H04L 9/0891 726/6 |
| 2014/0237239 | A1 * | 8/2014 | Hursti | H04L 9/32 713/168 |
| 2015/0143125 | A1 * | 5/2015 | Nix | H04W 4/70 713/171 |
| 2015/0200777 | A1 * | 7/2015 | Ni | G09C 1/00 380/46 |
| 2015/0365424 | A1 * | 12/2015 | Pelletier | H04L 9/0625 713/170 |
| 2016/0006570 | A1 * | 1/2016 | Falk | H04L 9/0866 380/44 |
| 2017/0063975 | A1 * | 3/2017 | Prakash | H04L 67/1002 |
| 2017/0116393 | A1 * | 4/2017 | Choi | G06F 21/10 |
| 2018/0026787 | A1 * | 1/2018 | Le Saint | H04L 9/0841 713/155 |
| 2018/0315352 | A1 * | 11/2018 | Irwin, Jr. | G06F 3/1222 |

FOREIGN PATENT DOCUMENTS

| | | | | |
|---|---|---|---|---|
| EP | 2120227 | A1 * | 11/2009 | ........... H04L 9/3073 |
| WO | WO-2008087734 | A1 * | 7/2008 | ........... H04L 9/3073 |
| WO | WO-2013101034 | A1 * | 7/2013 | ............. G06F 21/00 |
| WO | 2013160032 | A1 | 10/2013 | |
| WO | WO-2016134016 | A1 * | 8/2016 | ........... H04L 9/3213 |

OTHER PUBLICATIONS

U. Ruhrmair, "SIMPL systems, or: Can We Design Cryptographic Hardware without Secret Key Information?" SOFSEM 2011, pp. 26-45.

* cited by examiner

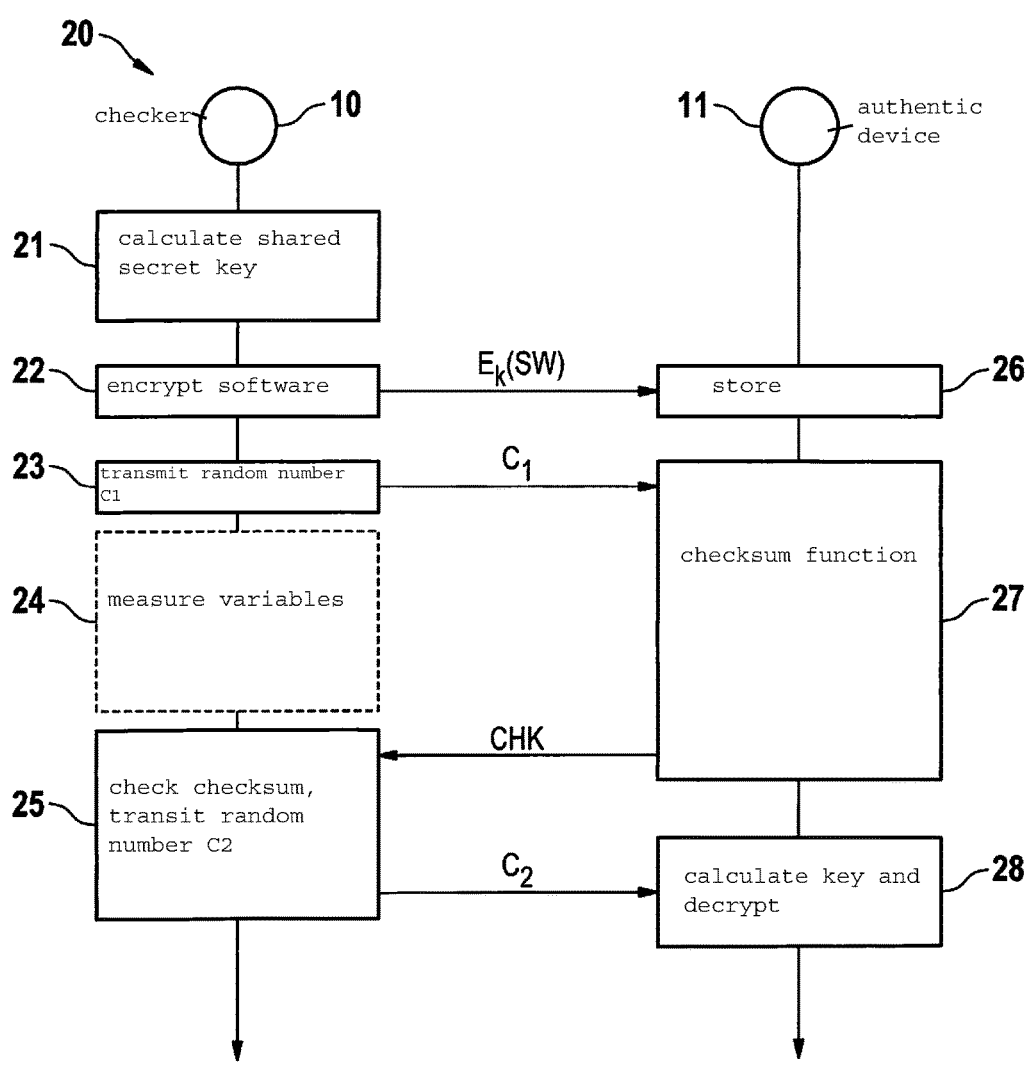

METHOD AND DEVICE FOR TRANSMITTING SOFTWARE

CROSS REFERENCE

The present application claims the benefit under 35 U.S.C. § 119 of German Patent Application No. DE 102015225651.0 filed on Dec. 17, 2015, which is expressly incorporated herein by reference in its entirety.

FIELD

The present invention relates to a method for transmitting software. In addition, the present invention relates to a corresponding device, a corresponding computer program, and a corresponding storage medium.

BACKGROUND INFORMATION

As a branch of information technology, information security is concerned with various issues, which are referred to in technical terminology as security objectives. In addition to availability and confidentiality, the integrity constitutes one of the typical security objectives. This is to be understood to mean the prevention of unauthorized modification of information in accordance with the internationally standardized Common Criteria for Information Technology Security Evaluation (CC). The additional security objective of authenticity describes the characteristics of authenticity, verifiability, and reliability of an object, in particular of a device.

The aforementioned objectives are of particular importance in the relatively new research field of cyber-physical systems (CPS). Those skilled in the art understand this general term to mean the combination of information technology-related or software-related components with mechanical or electronic parts which communicate via a data infrastructure such as the Internet. One design of cyber-physical systems results from the networking of embedded systems via wired or wireless communication networks, in particular so-called sensor networks.

In order to determine the originality of a component, PCT Application No. WO 2013 160032 A1 describes that a signature which is associated with the component is verified with the aid of a public key, at least one individual characteristic of the component being used for detecting the originality, without exclusive access to secret data being necessary. An up-to-date identifier, for example, a PUF value, is created as a function of at least one component-specific characteristic of the component. If the up-to-date created identifier corresponds to the verified signature, the originality of the component is deduced. In this case, the signature corresponds to a code word which is encrypted with the aid of a private key, for example, a private key of the manufacturer of the component.

SUMMARY

The present invention provides a method for transmitting software, a corresponding device, a corresponding computer program, and a corresponding storage medium.

One advantage of this approach is the guaranteed security that authentic software is downloaded and executed on an authentic hardware device, for example, a sensor. However, existing approaches may typically check only one of the two security criteria at once.

In contrast to a conventional attestation of the software integrity in terms of trusted computing, the provided method does not necessarily require the remote and yet precise measurement of the execution time on the sensor device.

In contrast to the aforementioned conventional approach, the mechanism according to the present invention also deals effectively with the situation in which a sensor has been infected with malware. Here, the approach of the checker is independent of whether or not malware is present. Here, all of the software of the target device is deleted and replaced by trusted software.

Unlike a great number of conventional approaches, the provided approach includes a characteristic related to implicit mutual authentication. Assuming that only the legitimate checker is capable of emulating the hardware function, or has previously measured it, a meaningful encryption may be calculated only by the legitimate checker. Thus, after the decryption, the checker may check for the existence of an artefact in the decrypted code, for example, a checksum of a portion of the software, and thus ensure that the software was encrypted by a legitimate source, for example, by an authentic hub.

In contrast to existing systems, one specific embodiment of the present invention requires no direct communication link, in particular no cable connection, between the checker and the device to be checked. Generally, the existing systems even require the communication between the checker and the device to be the sole communication, i.e., eavesdropping operations are impossible.

In addition, the approach in accordance with the present invention discussed herein prevents attacks which target the software as intellectual property, since the software may be decrypted only by the authorized, typically embedded device.

Advantageous refinements and improvements of the present invention are possible via the measures described herein. Thus, it may be provided that the hardware function is a physically unclonable function (PUF) of the device, or is based on a trusted platform module (TPM) of the device, a secret which characterizes the device, or a SIMPL system of the device, as recommended in U. Rührmair, "SIMPL systems: On a public key variant of physical unclonable functions," IACR Cryptology ePrint Archive, no. 255, 2009, and in U. Rührmair, "SIMPL Systems, or in SOFSEM 2011: Theory and Practice of Computer Science, pp. 26-45, Springer, 2011. In these cases, it is not possible for an active attacker to pose as the authorized device. In order to achieve this, the attacker would, for example, have to break the TPM cryptographically or clone the PUF, but it is not possible to carry out either of these attacks in practice with a reasonable level of effort.

According to another aspect, it may be provided that the software includes an executable program, for example, a code update, and the device executes this program after the decryption of the software. In this case, after the software update, the sensor device may provide the proof to the checker that it has successfully carried out the code update.

BRIEF DESCRIPTION OF THE DRAWINGS

Exemplary embodiments of the present invention are depicted in the figures and are described in greater detail below.

FIG. 2 shows the sequence diagram of a method according to one specific embodiment of the present invention.

DETAILED DESCRIPTION OF EXAMPLE EMBODIMENTS

Figure 1:
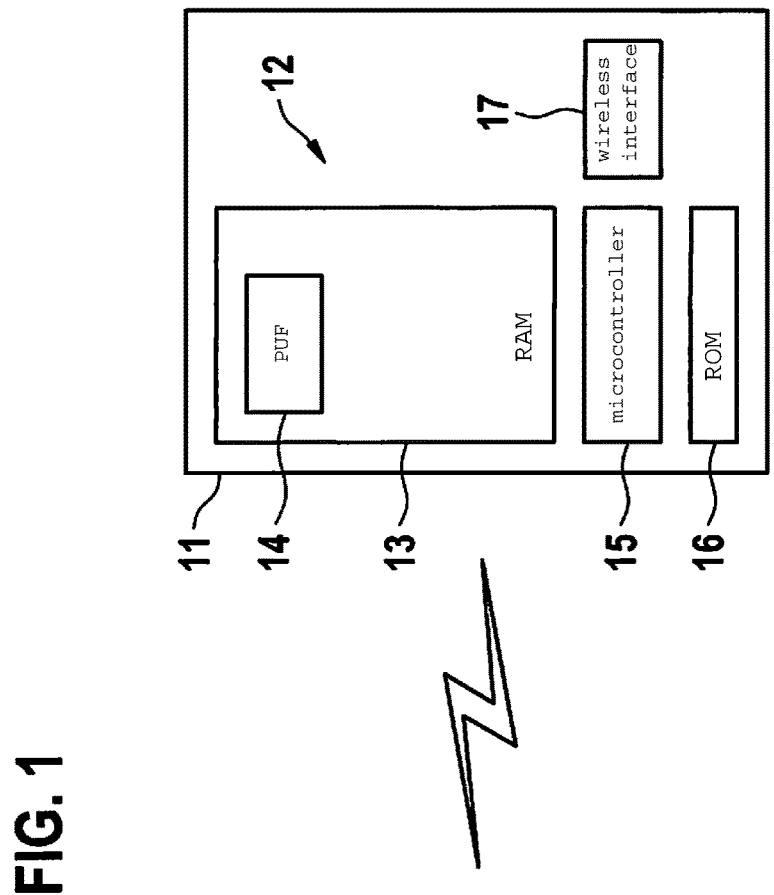
FIG. 1 shows the schematically simplified architecture of a sensor connected to a hub.
Figure 1:
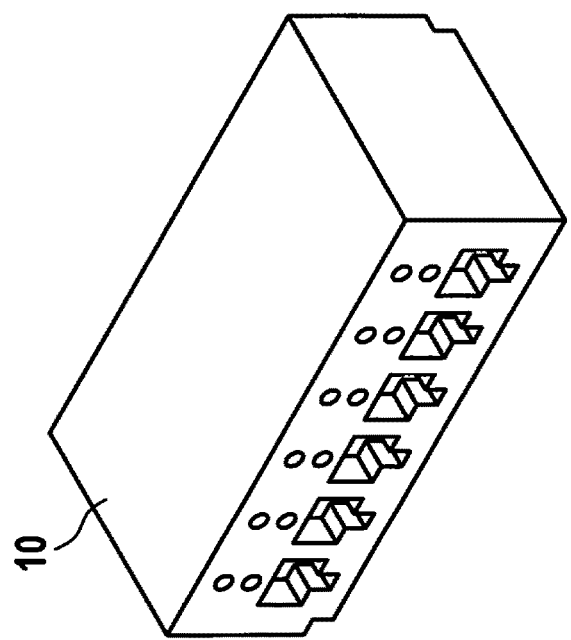

A method according to the present invention may, for example, be implemented in software or hardware or in a hybrid form from software and hardware, for example, in an embedded device 11 and a hub functioning as a checker 10, as the exemplary smart home scenario of FIG. 1 illustrates. In this case, the term "hub" is to be understood not in the limited sense of the ISO/OSI reference model, but rather in a broad sense, which includes every node networked with device 11, in particular wirelessly, if this hub is suitable for connecting device 11 to other nodes into a computer network, for example, a wireless sensor network.

In addition to possible additional components not depicted graphically, device 11 itself includes a random access memory 12 designed as a static random access memory (SRAM) having a physically unclonable hardware function 14 and sufficient memory capacity for storing software 13 provided for its operation. In the present embodiment, device 11 also includes a microcontroller 15, read-only memory (ROM) 16, and a wireless interface 17 which is suitable for reciprocal data exchange with checker 10.

FIG. 2 illustrates the sequence of method 20. It enables secure transmission and in particular updating of software 13 by linking software 13 to the authentic device 11 in a specific unrelenting manner with respect to electronic eavesdropping operations, man-in-the-middle attacks, malware, and counterfeit or manipulated hardware. The two parties, checker 10 and device 1), are involved in the provided mechanism. Device 11 must prove its authenticity and (software) integrity with respect to checker 10. Since checker 10, in this case, the hub, generally has sufficient computing resources, it is assumed below that its security is ensured via other mechanisms such as antivirus software 13, code signing, address space layout randomization, control flow integrity, or the like. In other words, it is to be generally assumed that checker 10 is reliable.

A basic assumption of the present embodiment is the presence of a manipulation-proof function f, which is inseparably linked to the authentic hardware of device 11. In other words, if a valid result R=f(C) is returned to checker 10 for any arbitrary input c, this may infer that function f was actually carried out by this specific, legitimate device 11. Examples of such a function include TPM, PUF 14 depicted in FIG. 1, and routines for integrity attestation. Generally, assuming that each checker 10 has a specific secret for device 11 which cannot be easily extracted by an attacker, a simple block code or a so-called keyed-hash function, for example, a keyed-hash message authentication code (HMAC) based on the hash function, may emulate function f.

It is furthermore assumed that checker 10 has a function f' which may be used to emulate the function f, although with certain limitations with respect to execution time or memory use. Examples of such a function f' include knowledge of the public key of the specific TPM, knowledge of the challenge-response pairs of PUF 14, or, in the case of a weak PUF 14, knowledge about the secret keys stored by the latter. Other examples of f' which are not based on secret knowledge include the aforementioned SIMPL systems and the runtime behavior [of] selected program codes executed on device 11.

Given these two assumptions, method 20 ensures the authenticity of device 11 and the integrity of software 13 which device 11 will execute after method 20 is completed.

In first step 21, checker 10 generates two random numbers $C_1$ and $C_2$ with the aid of a suitable random number generator, for example, a physical random number generator (true random number generator, TRNG). It then calculates a shared secret key k according to the following rule:

$$k=f'(C_2)$$

Next, checker 10 encrypts (step 22) software 13 to be transmitted and to be executed by device 11 using the secret key k, as follows:

$$SW_k=E_k(SW/\text{random})$$

Here, $E_k$ refers to a cryptogram obtained, for example, according to AES with the aid of the secret key k. Software 13 is padded with random data in order to ensure that the resulting cryptogram $E_k(SW/\text{random})$ has approximately the same size as random access memory 12 of device 11, so that there is very little remaining capacity of random access memory 12 for carrying out the rest of method 20. Checker 10 now transmits the cryptogram $SW_k$ to device 11.

After receiving cryptogram $SW_k$, device 11 stores (step 26) it in its writable memory, including random access memory 12, whereby it overwrites its full previous memory content, including any malicious software. The content of random access memory 12 of device 11, after it has stored $SW_k$, is denoted by M below.

In next step 23, checker 10 transmits random number $C_1$ to device 11. In turn, the device uses $C_1$ as the input of the aforementioned function f. Result $f(C_1)$ is fed to a checksum function g (step 27), together with content M of random access memory 12 of device 11, and thus the proof is provided that device 11 has stored the full received cryptogram, so that it may be assumed that any malware has been deleted, and device 11 has access to function f:

$$CHK=g(f(C_1),M)$$

Examples of function g include cryptographic signatures such as HMAC, cryptographically secure hash functions such as the hash functions of the SHA family, or, if the security risks are justifiable, any other (suitable) hash function, for example, a cyclic redundancy check (CRC).

Optionally, checker 10 measures (step 24) a set of predefined logical and/or physical measured variables O, while device 11 calculates the checksum $CHK=g(f(C_1), M)$. As a following step 25 illustrates, monitoring O provides additional options for checking whether it is actually the specific (authentic) device 11 which executes function f. An example of a physical measured variable is the distance measurement, i.e., the measurement carried out by checker 10, of the execution time of f.

In the following step, device 11 transmits the checksum CHK to checker 10. The checker calculates a reference value g ($f'(C_1)$, M)) and compares it (step 25) to the received checksum CHK. Optionally, checker 10 calculates the expected values O' of the predefined logical and/or physical measured variables and compares the results to the actual measurements O.

If the checks 25 run successfully, i.e., the values returned by device 11 and the values of checker 10 agree, checker 10 transmits random number $C_2$ to device 11. The device calculates $k=f(C_2)$ and decrypts (step 28) the cryptogram $SW_k$ by calculating $D_k(E_k(SW))$, where $D_k$ denotes a decryption, for example, according to AES using the secret key k. This is the last step of the provided method 20. After the decryption of software 13, device 11 may execute it and thereby switch into normal operating mode, for example, for transmitting measured sensor values to the hub functioning as checker 10.

Since, apart from checker 10, only the legitimate device 11 is able to calculate the correct result $k=f(C_2)$, method 20 ensures that only the legitimate device 11 is able to decrypt software 13. This in turn prevents third parties from decrypting and operating software 13. In other words, it prevents the theft of intellectual property (IP), for example, via dissemination and reverse engineering of software 13, and eliminates the threat caused by counterfeit sensors connected to the hub. Since, in addition, checksum CHK of content M of random access memory 12 of device 11 is checked before device 11 is allowed to decrypt software 13, i.e., before the transmission of $C_2$ to device 11, it is ensured that no malware is present in random access memory 12 of device 11 if, by transmitting $C_2$, checker 10 is enabled to decrypt and execute the original software 13. Finally, since only the legitimate checker 10 is able to calculate the key $k=f'(C_2)$, device 11 is assured of the authenticity of checker 10.

What is claimed is:

1. A method for transmitting software to a remote device, comprising:
   generating, by a checker, a first random number and a second random number;
   calculating, by the checker, a cryptographic key based on the second random number using an emulation function which emulates a physical unclonable function (PUF) of the device;
   encrypting, by the checker, the software into a cryptogram using the key;
   transmitting to the device by the checker the cryptogram;
   transmitting to the device by the checker the first random number;
   receiving from the device by the checker a checksum;
   calculating, by the checker, a reference value based on the first random number and the cryptogram, using the emulation function and a predefined cryptographic hash function;
   checking, by the checker, the checksum based on the reference value; and
   transmitting, by the checker, the second random number to the device only when the checking is successful.

2. The method as recited in claim 1, wherein, between the transmission of the first random number and the reception of the checksum, the checker measures a measured variable, the measured variable being a time span between the transmission of the first random number and the reception of the checksum, and the checker subjects the measured variable to a further checking, wherein the transmitting, by the checker, of the second random number occurs only when the further checking is successful.

3. The method as recited in claim 1, wherein:
   the device receives the cryptogram and the first random number from the checker;
   the device stores the cryptogram in a local random access memory of the device;
   the device calculates the checksum based on the first random number and the received cryptogram, using the hash function and the PUF of the device;
   the device transmits the checksum to the checker;
   the device receives the second random number from the checker;
   the device calculates the key based on the second random number, using the PUF; and
   the device decrypts the software from the cryptogram using the key.

4. The method as recited in claim 3, wherein the software includes an executable program, and the device executes the program after the decryption of the software.

5. The method as recited in claim 1, further comprising:
   padding the software, by the checker, before the encryption in such a way that the cryptogram fills a random access memory of the device.

6. The method as recited in claim 1, wherein at least one of: i) the checksum and the reference value are message authentication codes based on the hash function, ii) the hash function is a secure hash algorithm, and iii) the check is a cyclic redundancy check.

7. A non-transitory machine-readable storage medium on which is stored a computer program for transmitting software to a remote device, the computer program, when executed by a processor, causing the processor to perform:
   generating a first random number and a second random number;
   calculating a cryptographic key based on the second random number using an emulation function which emulates a physical unclonable function (PUF) of the device;
   encrypting the software into a cryptogram using the key;
   transmitting to the device by the checker the cryptogram;
   transmitting to the device by the checker the first random number;
   receiving from the device by the checker a checksum;
   calculating a reference value based on the first random number and the cryptogram, using the emulation function and a predefined cryptographic hash function;
   checking the checksum based on the reference value; and
   transmitting the second random number to the device only when the checking is successful.

8. A device for transmitting software to a remote device, the device designed to:
   generate a first random number and a second random number;
   calculate a cryptographic key based on the second random number using an emulation function which emulates a physical unclonable function (PUF) of the remote device;
   encrypt the software into a cryptogram using the key;
   transmit to the remote device the cryptogram;
   transmitting to the remote device the first random number;
   receive from the remote device a checksum;
   calculating a reference value based on the first random number and the cryptogram, using the emulation function and a predefined cryptographic hash function;
   check the checksum based on the reference value; and
   transmit the second random number to the remote device when the checking is successful.

* * * * *